United States Patent Office 2,802,821
Patented Aug. 13, 1957

2,802,821

BIS (HEXITYL AMINO COMPOUNDS) AND FUNCTIONAL DERIVATIVES THEREOF

John D. Zech, Wilmington, Del., assignor to Atlas Powder Company, Wilmington, Del., a corporation of Delaware No Drawing. Application March 16, 1953,
Serial No. 342,745

14 Claims. (Cl. 260—211)

This invention relates to organic chemical compounds, and more particularly to organic compounds containing two substituted hexityl amine radicals, and functional derivatives of such compounds.

It is an object of the invention to provide novel organic compounds containing two substituted hexityl amino radicals. Another object is to provide functional derivatives of such bis hexityl amino compounds.

A further object is to provide novel processes for preparing bis glucamino compounds and their functional derivatives.

The above and other objects will become more apparent in the course of the following description of the invention and in the appended claims.

The structure of the compounds contemplated in the present invention will be best understood from a description of processes for making them and an enumeration of the reactants which may be employed to yield the said compounds. The bis hexityl amino compounds of the invention are prepared by causing two molecular proportions of a secondary hexityl amine to react with one molecular proportion of a difunctional organic compound such for example as a di-halide, or a di-epoxide, or an epoxy organic halide.

Suitable difunctional organic compounds with which secondary hexityl amines will react to form the bis hexityl amino products of the invention include the di-halides of atomic number greater than 10, preferably the α,ω-dihalides, of aliphatic hydrocarbons and of araliphatic hydrocarbons; glyceryl dichlorhydrin, symmetrical dichloralkyl ethers and -polyalkylene ethers; hydroxy dichloraliphatic ethers; ω-chlor-aliphatic 1,2 epoxides; butadiene 1,4-dichlor-butene-2
1,10-dibrom-decane
p-Xylylene dichloride
m-Xylylene dibromide Dichlor-alkyl ethers and -polyalkylene ethers:
Dichlor-ethyl ether
Bis bromo-ethyl ether of triethylene glycol
Dichlor-propyl ether Hydroxy dichlor-aliphatic ethers:
3,3-dichloro-2,2-dihydroxy dipropyl ether Chlor-aliphatic 1,2-epoxides:
Epichlorhydrin
Chlor-ethyl ether of glycidol
1 chloro-2 hydroxy-3,4 epoxy butane Diglycidyl ethers:
Diglycidyl ether of hydroquinone
Diglycidyl ether of resorcinol
Diglycidyl ether of 2,2-di(parahydroxy phenyl) propane
Diglycidyl ether of glycerol
Diglycidyl ether of ethylene glycol Secondary hexityl amines coming within the scope of the hereinbefore-defined hexityl amine reactant employed in the process and furnishing the hexityl amino radicals ofthe compounds of the invention include N-substituted glycamines, N-substituted fructamines and the like, which compounds may be prepared by the hydrogenation of hexoses in the presence of primary amines. Specific hexityl amines which may be employed in accordance with the invention include N-methyl glucamine, N-methyl fructamine, N-ethyl glucamine, N-propyl fructamine, N-lauryl-, N-cetyl-, N-oleyl- and N-stearylglucamines, N-ethanol fructamine, N-isopropanol glucamine, N-benzyl fructamine, N-phenyl glucamine, and the like.

As pointed out hereinbefore, the bis hexityl amine products of the invention are formed by the reaction of 2 molecular proportions of a secondary hexityl amine with one molecular proportion of a difunctional compound, all as defined and illustrated above. When the reacting functional group of the said defunctional compound is an epoxide group the reaction is one of addition and is accompanied by the generation of a hydroxyl group. Such a reaction is illustrated by the following equation showing the reaction between butadiene dioxide and methyl glucamine.

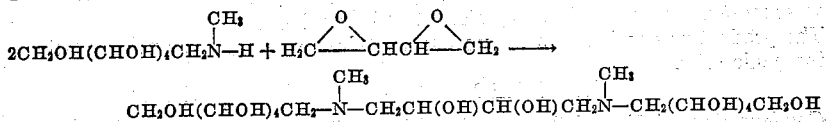

dioxide and its homologues of the generic formula

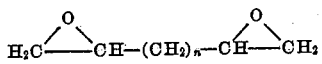

and diglycidyl ether and diglycidyl ethers of aliphatic and aromatic polyols. Specific compounds falling within the several groups enumerated above are enumerated in tabular form below.

Dihalides of aliphatic and araliphatic hydrocarbons:
Ethylene dichloride
Ethylene dibromide
1,4-dichlor-butane The epoxide addition reaction is conveniently carried out by adding the epoxide reactant gradually to the secondary glucamine at such a temperature that the reaction proceeds without the further application of heat. Preferred temperatures are from about 80° C. to about 150° C. The reaction may be carried out in the presence of an inert diluent which may be a solvent for one or both of the reactants.

When the reacting functional group is a halide, the reaction is one of condensation and the hydrohalide of the condensed amine is formed. The free amine is obtained by treatment of the salt with an alkaline material. Alternatively, and especially with the less vigorously reactive halides, the free base may be obtained directly by carrying out the condensation in the presence of a mild alkali such as sodium bicarbonate, calcium carbonate, or the like, to accept the formed hydrogen halide. A suitable solvent or diluent such as water, alcohol, lower ether alcohol, or the like, may be present and reaction temperatures of 90° to 150° C. are desirable. Superatmospheric pressures may be necessary to attain the desired temperature in the presence of water or other low boiling solvents.

After completion of the reaction, the sought product (the dihexityl amino compound) may be separated from the inorganic salts by known methods such as ion-exchange, filtration, etc. The condensation reaction may be illustrated by the following equations showing the condensation of methyl glucamine with dichlorethylene.

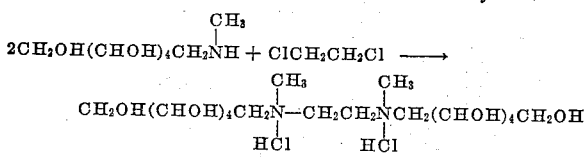

Detailed preparations of several compounds in accordance with the invention is shown in the following examples.

EXAMPLE 1

*Preparation of 1,3-di(N-methyl glucamino)-2-hydroxy-propane*

A 3-liter, 3-neck flask fitted with a stirrer, thermometer, reflux condenser, and a dropping funnel was charged with 600 g. methyl glucamine and 300 cc. of water. The mixture was heated to 100° C. and the epichlorhydrin (141 g.) was added dropwise without the application of heat during 23 minutes, the heat of reaction being sufficient to maintain a temperature of 98–100° C. A solution of 60 g. sodium hydroxide in 120 cc. water was added during nine minutes and the reaction mixture stirred at 100° C. for another hour after which the water was distilled off using vacuum (2.5 mm.) at the end to strip out all of the water at a final temp. of 140° C. The residue was dissolved in 800 cc. methanol and the solution filtered to remove inorganic salts. The methanol was then distilled off, finally under vacuum leaving the di-glucamine as a resinous residue.

EXAMPLE 2

*Preparation of 1,4 di(N-methyl glucamino)-butane*

A 1-liter, 3-neck flask fitted with a stirrer, thermometer and a reflux condenser was charged with 195 g. methyl glucamine, 64 g. 1,4-dichlorbutane, 300 cc. water and 84 g. sodium bicarbonate. The mixture was refluxed with stirring for about 17 hours after which the water was distilled off to a final temperature of 143° C. at 5 mm. The residue was dissolved in 250 cc. methanol and filtered to remove inorganic salts, after which the product (235 g.) was recovered from the filtrate by distilling off the solvent. The product was resinous in nature and contained some inorganic salts.

EXAMPLE 3

*Condensation of N-methyl glucamine with a diepoxide*

97.5 g. of methyl glucamine was melted and 93 g. of Epon 1062 (epoxide equivalent 186) was added at 134° to 143° C. during 15 minutes. The reaction was exothermic. The reaction mixture was maintained at 125°–142° C. for another hour to complete the reaction. The product was a brittle glassy resin. Epon 1062 is a polyepoxide derived from the condensation of three moles of epichlorhydrin with one mole of glycerine as described in U. S. Patent No. 2,581,464.

Further examples of the preparation of bis glucamino compounds in accordance with the invention are presented in tabular form below.

| Example No. | 4 | 5 | 6 | 7 |
|---|---|---|---|---|
| N-Me glucamine, gms. | 200 | 398 | 195 | 195. |
| Difunctional Reactant used.[1] | B | C | D | C. |
| Difunctional Reactant, gms. | 102 | 188 | 71.5 | 94. |
| Water, ml | 180 | 300 [2] | 300 | 300. |
| Alkali used | NaOH | Na$_2$CO$_3$ | NaHCO$_3$ | NaHCO$_3$. |
| Alkali, gms | 40 | 110 | 84 | 84. |
| Reaction Time, hrs | 2.5 | 9 | 14 | 13.25. |
| Reaction Temp., °C | 87–101 | 110–125 | 100–107 | 92–105. |
| Alkali added | after condensate. | after condensate. | at start | at start. |

[1] B=3,3-dichlor-2,2-dihydroxy dipropyl ether; C=ethylene dibromide; D=dichlordiethyl ether.
[2] Cellosolve employed instead of water. 20 ml. water added after the Na$_2$CO$_3$ was introduced.

The bis hexityl amine compounds of the invention are usually resinous in character, although their nature varies somewhat with their structure. The presence of higher alkyl radicals such as cetyl or stearyl, attached to the nitrogen of the glucamine residue renders the compounds waxy.

By virtue of the presence in the bis hexityl amino compounds of reactive, or functional, groups, they can be readily converted into valuable functional derivatives which are useful as surface active agents, corrosion inhibitors, textile assistants, detergents, and the like. The said reactive groups are the hydroxyl radicals which may be readily esterified or etherified, and the tertiary nitrogen atoms which are susceptible to quaternization or to soap formation. Quaternization may be effected by reaction with alkyl or aryl halides or with inorganic acid esters of alcohols. Soaps of the bis hexityl amino compounds are obtained by partial or complete neutralization of the tertiary nitrogen atoms with higher fatty acids, rosin or resin acids, tall oil, higher alkyl acid sulfates, higher alkyl aryl sulfonic acids and the like. Such functional derivatives are considered within the scope of the present invention.

Esters of the bis hexityl amino compounds described herein may be prepared by direct esterification with organic acids, by reaction with acyl halides in the presence of alkalis, by reaction with acid anhydrides, by alcoholysis reaction with esters of organic acids, and the like. Acid radicals which may be introduced into the esters of the invention by one or more of the above methods include the radicals of acetic, butyric, caproic, capric, lauric, myristic, palmitic, stearic, oleic, behenic, linoleic, lactic, erucic, benzoic, p-tert. butyl benzoic, phenyl acetic, phenoxyacetic, 2,4-dichlorphenoxyacetic, 2,4,5-trichlorphenoxyacetic, rosin, tall oil, and other carboxylic acids.

When the esters are esters of the higher saturated fatty acids such as palmitic or stearic, they are hard waxes. Unsaturated fatty acids yield softer esters. The higher fatty acid esters are conveniently prepared by bringing the bis glucamino compound to a reaction temperature of 170° to 220° C. and gradually introducing one or more molecular proportions of the fatty acid thereto under vigorous agitation and in the presence of an inert atmosphere. When the first increments of acid are added, the viscosity of the reacting mixture is sharply increased, probably because of the formation of amine soaps of the fatty acids. At the reaction temperature, however, the soaps are soon decomposed and the fatty acids consumed by esterification, thereby restoring the higher fluidity of the reacting mass. When all of the fatty acid is added, the reaction is continued until the acid number reaches a substantially consistent low value. In the course of the direct esterification of the bis hexityl amino derivatives with higher fatty acids under the conditions described, some anhydridization of the polyhydric residues occurs, forming cyclic inner ether radicals. This is evidenced by the evolution of more water during the reaction than can be accounted for by esterification. The ester products so obtained are mixtures of esters of bis hexityl amino compounds and esters of partially anhydridized derivatives thereof. Examples 8 to 16 presented in tabular form below, show suitable reacting conditions for preparing specific fatty acid esters of bis glucamino compounds within the scope of the invention.

| Ex. No. | Bis glucamino compound | | Fatty acid | | Reaction Conditions | | |
|---|---|---|---|---|---|---|---|
| | used | grams. | used | grams | Time, Hrs. | Temp., °C. | Press. |
| 8 | Ex. 1 | 124 | stearic | 74.5 | 4 | 150-190 | 1 to 2 mm. |
| 9 | Ex. 4 | 260 | oleic | 270 | 3¼ | 164-218 | atm. |
| 10 | Ex. 1 | 230 | stearic | 149 | 1¾ | 182-207 | 10 mm. |
| 11 | Ex. 1 | 230 | ---do--- | 568 | 5¼ | 190-212 | atm. |
| 12 | Ex. 1 | 230 | oleic | 200 | 2¾ | 183-196 | 6.5 to 22 mm. |
| 13 | Ex. 1 | 109.5 | lauric | 46.5 | 2⅔ | 190-194 | atm. |
| 14 | Ex. 2 | 215 | stearic | 197 | 2½ | 193-211 | atm. |
| 15 | Ex. 6 | 217.5 | coconut | 177 | 3¼ | 186-213 | atm. |
| 16 | Ex. 7 | 186 | cotton-seed. | 250 | 4¼ | 190-215 | atm. |

The bis hexityl amino compounds of the invention, or their partial esters are readily susceptible to ether formation, particularly by reaction with alkylene oxides whereby hydroxy alkyl or hydroxy polyoxyalkylene ethers are formed. When the alkylene oxide is ethylene oxide the resulting hydroxyethyl ethers are more readily dispersible in water than are the starting compounds.

The hereinbefore described bis hexityl amino compounds, their esters and/or their ethers may readily be converted to quaternary ammonium compounds by reaction with organic halides or inorganic acid esters of alcohols. One or both of the tertiary nitrogen atoms of the compounds may be so converted to yield strongly basic compounds or salts of such strongly basic compounds. The said quaternary derivatives are of value as textile assistants, anti-static agents and as detergents.

What is claimed is:

1. A bis (N-alkyl hexityl amino) compound comprising two N-alkyl hexityl amino radicals linked by their respective nitrogen atoms through divalent radicals selected from the group consisting of alkylene, oxa-alkylene, hydroxy alkylene and hydroxy oxa-alkylene radicals.

2. Compounds as in claim 1 wherein the secondary hexityl amino radicals are N-methyl glucamino.

3. 1,3-bis(N-methyl glucamino)-2-hydroxy-propane.

4. 1,2-bis(N-methyl glucamino)-ethane.

5. 2,2'-bis(N-methyl glucamino)-diethyl ether.

6. 3,3'-bis(N-methyl glucamino)-2,2' dihydroxy dipropyl ether.

7. The process of producing compounds containing two N-alkyl hexityl amino radicals which comprises reacting two molecular proportions of an N-alkyl hexityl amine with one molecular proportion of a compound containing two functional groups reactive with amino nitrogen selected from the group consisting of (1) alkylene and hydroxyalkylene dihalides, (2) oxa-alkylene and hydroxy oxa-alkylene dihalides, (3) alkylene and hydroxyalkylene diepoxides, (4) oxa-alkylene and hydroxy oxa-alkylene diepoxides, (5) halo-alkylene and halo-hydroxyalkylene epoxides, (6) halo-oxa-alkylene and halo (hydroxy)-oxa-alkylene epoxides; wherein the said halide and halo-atoms are of atomic number greater than 10.

8. The process of claim 7 wherein the said difunctional compound is a dihalide.

9. The process of claim 7 wherein the said difunctional compound is a diepoxide.

10. The process of claim 7 wherein the said difunctional compound is a halo-alkylene epoxide.

11. The process of claim 7 wherein the said hexityl amine is N-methyl glucamine.

12. The process of preparing 1,3-bis(N-methyl glucamino)-2-hydroxy propane which comprises introducing gradually 1 molar proportion of epichlorhydrin into an aqueous solution of two molar proportions of N-methyl glucamine at a temperature of about 100° C., subsequently adding one molar proportion of aqueous alkali at the same temperature, and recovering the formed 1,3-bis(N-methyl glucamino)-2-hydroxy propane.

13. A composition comprising a carboxylic acid ester of the product of claim 1.

14. A composition as in claim 13 wherein the carboxylic acid is a higher fatty acid.

References Cited in the file of this patent

UNITED STATES PATENTS

| 2,060,851 | Calcott et al. | Nov. 17, 1936 |
| 2,091,105 | Piggott | Aug. 24, 1937 |
| 2,294,379 | Bley | Sept. 1, 1942 |

FOREIGN PATENTS

| 178,102 | Sweden | Sept. 2, 1935 |